(12) United States Patent
Casaus

(10) Patent No.: US 7,406,989 B1
(45) Date of Patent: Aug. 5, 2008

(54) CART WHEEL WITH STATIC DISSIPATIVE MECHANISM

(75) Inventor: Jorge Casaus, Euless, TX (US)

(73) Assignee: P & H Casters Co., Inc., Arlington, TX (US)

( * ) Notice: Subject to any disclaimer, the term of this patent is extended or adjusted under 35 U.S.C. 154(b) by 58 days.

(21) Appl. No.: 11/384,642

(22) Filed: Mar. 20, 2006

(51) Int. Cl.
 *B60B 33/00* (2006.01)
(52) U.S. Cl. .................. 152/323; 152/DIG. 2; 361/216
(58) Field of Classification Search .................. 152/323, 152/DIG. 2; 361/212, 216, 217, 220, 221; 295/1, 11, 21, 31.1; 16/18 R, 45, 46, 47; 191/63
 See application file for complete search history.

(56) References Cited

U.S. PATENT DOCUMENTS

| 608,234 | A | 8/1898 | Slayton |
|---|---|---|---|
| 1,682,899 | A | 9/1928 | Fletcher |
| 1,797,545 | A | 3/1931 | Churcher |
| 2,267,503 | A | 12/1941 | Lytle |
| 2,324,589 | A | 7/1943 | Lytle |
| 2,339,546 | A * | 1/1944 | Hanson .................. 152/152.1 |
| 2,641,294 | A | 6/1953 | Bridgefield |
| 2,669,485 | A | 2/1954 | Newman et al. |
| 2,686,891 | A | 8/1954 | Burgin |
| 3,815,959 | A | 6/1974 | Hill |
| 4,072,373 | A | 2/1978 | Black |
| 4,318,204 | A | 3/1982 | Black |
| 4,716,997 | A | 1/1988 | Gibson |
| 4,763,383 | A | 8/1988 | Estkowski et al. |
| 4,773,122 | A | 9/1988 | Wilcox |
| 4,779,321 | A | 10/1988 | Black |
| 4,934,022 | A | 6/1990 | Lissner |
| 5,021,918 | A | 6/1991 | Maki |
| 5,211,213 | A | 5/1993 | Hicks |
| 5,990,498 | A * | 11/1999 | Chapnik et al. ................ 257/99 |
| 6,398,395 | B1 * | 6/2002 | Hyun ......................... 362/500 |
| 6,422,656 | B2 | 7/2002 | Denner et al. |
| 6,786,559 | B1 | 9/2004 | Kidd et al. |

FOREIGN PATENT DOCUMENTS

| CH | 597008 | A | * | 3/1978 |
|---|---|---|---|---|
| CH | 643189 | | | 5/1984 |
| DE | 4117885 | A1 | * | 12/1992 |
| DE | 29916797 | U1 | * | 12/1999 |
| JP | 54102711 | A | * | 8/1979 |
| JP | 62205802 | A | | 10/1987 |
| JP | 01293208 | A | * | 11/1989 |

* cited by examiner

*Primary Examiner*—Russell D. Stormer
*Assistant Examiner*—Kip T Kotter
(74) *Attorney, Agent, or Firm*—Geoffrey A. Mantooth

(57) ABSTRACT

A wheel for a cart has a static dissipative mechanism. The wheel has a hub that has a central bore for receiving one or more bearings. The outer periphery of the hub has a conductive ring that has projections extending radially outward. The projections are surrounded by a tread material. A conductive wire extends from the central bore where the bearings are, on the outside of the hub, to the conductive ring. A conductive path is provided for the cart through the bearings, the wire, the conductive ring to ground.

9 Claims, 3 Drawing Sheets

CART WHEEL WITH STATIC DISSIPATIVE MECHANISM

FIELD OF THE INVENTION

The present invention relates generally to wheel assemblies for material handing equipment, such as carts.

BACKGROUND OF THE INVENTION

Material handling equipment, such as carts, are used to transport a variety of objects. One example of a cart is a shopping cart used to transport groceries in the store and to and from vehicles. Another example of a cart is a utility cart used to transport dry goods such as lumber, and other kinds of bulk materials. Still another kind of cart is a luggage cart, a baker's rack, and so on.

The carts roll on wheels. The wheels are typically provided with a rubber or plastic tread, which tread is non-conductive.

When the cart moves across a surface, such as a store floor, the cart picks up an electrical charge in low humidity environments. The phenomena is similar to a person in socks or rubber sole shoes shuffling on a carpet in a low humidity environment. When the person touches a door knob or other metal object that is grounded, a static discharge occurs and the person feels "shocked". Similarly, with a cart, as the cart becomes electrically charged, due to its electrical isolation from the ground, it can be discharged through a person, resulting in an unpleasant electrical shock. The shock occurs when the person touches the cart through grounded shoes or touches the cart and the grounded object such as a metal shelf or counter.

It is desirable to make the cart self-grounding in order to avoid the build-up of an electrical charge and the discharge thereof. A self-grounded cart has an electric path from the cart to the ground. This electric path can be separate from the wheels or can be through the wheels.

In the prior art, electrical paths are provided by a metal chain that is separate from the wheel. An example is shown by Lissner, U.S. Pat. No. 4,934,022. The chain extends from the metallic body or chassis of the cart to the ground. The chain is typically located adjacent to a wheel. The chain picks up debris as it drags along the ground. This debris may cause the chain to lose its electrical connection to the ground.

Still another way to ground the cart is directly through the wheels. Various prior art patents accomplish this, such as U.S. Pat. Nos. 4,716,997 and 6,786,559, as well as Swiss Patent No. 643,189.

It is desirable to have a low cost wheel that is reliable and that provides a conductive path to the ground.

SUMMARY OF THE INVENTION

The present invention provides a wheel for a cart, comprising a hub having a central bore structured and arranged to receive a bearing and an axle. The hub is made of a nonconductive material. A conductive ring is located on an outer periphery of the hub, the conductive ring has projections that extend radially outward. A tread encompasses the outer projections. The outer projections have ends that are exposed. The tread is made of a nonconductive material. A second conductor extends from the central bore of the hub to the conductive ring. The second conductor has a central portion that is located on an exterior of the hub.

In accordance with one aspect of the present invention, the conductive ring is made of a first material and the second conductor is made of a second material.

In accordance with still another aspect of the present invention, the conductive ring comprises plastic with conductive particles.

In accordance with still another aspect of the present invention, the second conductor comprises a metal wire.

In accordance with still another aspect of the present invention, the second conductor comprises a central portion that is located on an exterior of the hub, the second conductor further comprising end portions, with one end portion being exposed in the hub central bore and the other end portion extending into the hub to contact the conductive ring.

In accordance with still another aspect of the present invention, the second conductor has a portion embedded in the tread.

In accordance with still another aspect of the present invention, the conductive ring is made of a first material and the second conductor is made of a second material. The conductive ring comprises plastic with conductive particles. The second conductor comprises a metal wire. The second conductor comprises a central portion that is located on an exterior of the hub, the second conductor further comprising end portions, with one end portion being exposed in the hub central bore and the other end portion extending into the hub to contact the conductive ring. The second conductor has a portion embedded in the tread.

The present invention also provides a method of making a wheel for a cart. A hub is provided that is made of a nonconductive material, the hub comprising a central bore for receiving a bearing. A conductive ring is installed on a circumference of the hub, the ring comprising conductive projections that extend out from the hub. A second conductor is positioned on the hub and extends from the central bore to the conductive ring. A tread is formed on the circumference of the hub, the tread retains the conductive ring and the second conductor in place. A bearing is inserted into the central bore so as to contact the bearing with the second conductor.

DESCRIPTION OF THE PREFERRED EMBODIMENT

Figure 2:
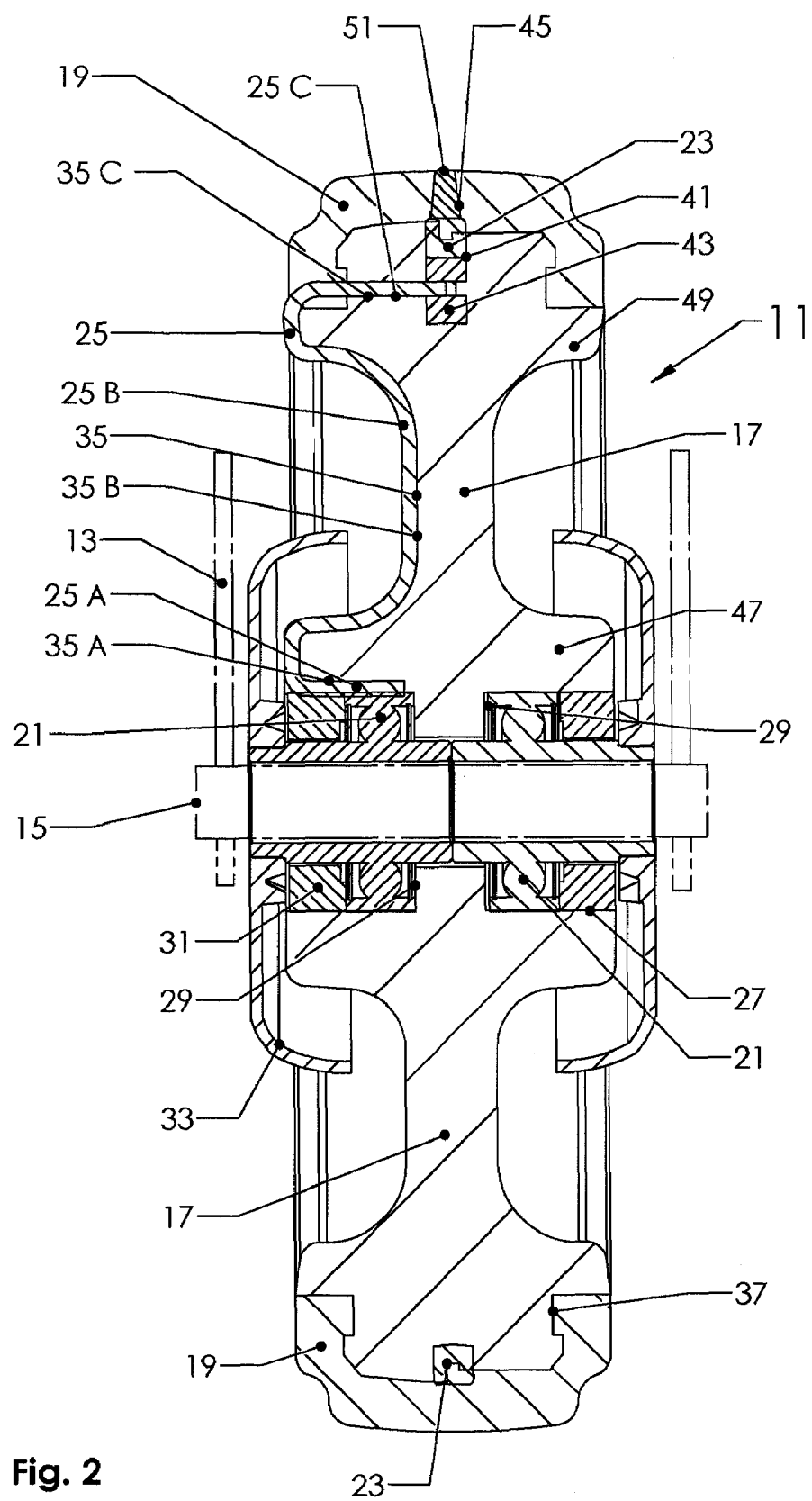
FIG. 2 is a cross-sectional view taken along the length of the axis of the cart wheel of FIG. 1.
Figure 3:
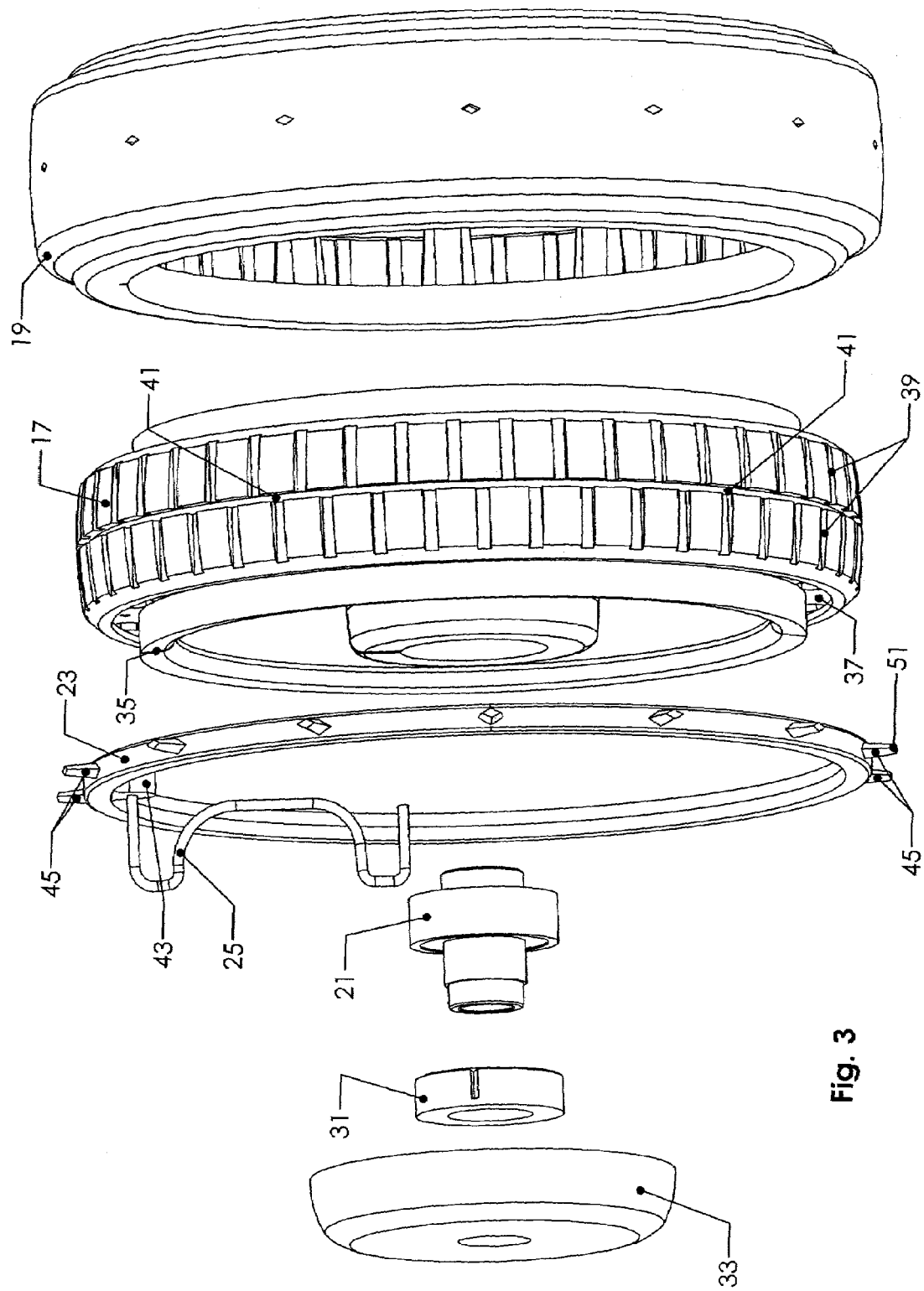
FIG. 3 is an exploded isometric view of the various components of the wheel as they would appear if not assembled together.

The wheel of the present invention can be used on a variety of types of material handling equipment. A typical example is to use the wheel on a shopping cart. A shopping cart has a chassis, which chassis is supported above the ground by four or more wheels. In a typical shopping cart, such as used in a grocery store, the cart has two rear fixed wheels and two front wheels that can pivot so as to steer the shopping cart. The wheel 11 (see FIG. 2) is attached to the cart by way of a yoke 13. An axle 15 extends through the wheel and is coupled to the yoke.

Referring to the Figs. the wheel 11 of the present invention has a hub 17, a tread 19, bearings 21, a conductive ring 23, and a wire 25. The axle 15 and bearings 21 are made of metal and are therefore electrically conductive. The wire 25 and conductive ring 23 provide an electrical path from the axle 15 and bearings 21 to the outer circumference of the wheel. The conductive ring 23 provides a number of discharge points along the circumference of the wheel. Thus, as the cart is moved along, and the wheel rotates, an electrically conductive path is provided from the cart chassis through the yoke 13, axle 15, bearings 21, wire 25, and conductive ring 23 to the ground.

As the wheel is in use, the tread 19 will exhibit wear. As the tread wears, the conductive ring 23 maintains a number of electrically conductive paths to the outside perimeter of the wheel, and thus provides a grounding path.

The hub 17 is molded from plastic. Typically, the plastic is non-conductive. The hub 17 is provided with a central bore 27. The bore has a shoulder 29. The bore receives inner races of the bearings 21, as well as the axle. The outer races of the bearings contact the shoulder 29. In the preferred embodiment, the hub is provided with two bearings one on each side of the shoulder 29. However, various bearing arrangements can be utilized. For example, Hicks, U.S. Pat. No. 5,690,395 shows another bearing arrangement. The entire disclosure of U.S. Pat. No. 5,690,395 is incorporated herein by reference.

The particular bearings 21 shown in the illustrations are kept in place by bushings 31 which are press fit into the central bore 27. The inner races of the bearings extend out beyond the bushings 31 to receive thread guards 33 and toward the yoke 13.

The hub 17 has a channel 35 for receiving the wire 25. The channel has a first portion 35A located in the central bore; this portion allows the wire 25 to electrically contact the bearing 21. The first portion 35A of the channel need only extend into the central bore 27 far enough to allow contact with one bearing. The channel has another portion 35B that is on the exterior of the hub and extends from the central bore 27 to a location near the outer circumference of the hub. The channel has a third portion 35C that extends into the hub near the outer circumference.

The hub 17 is provided with a tread 19. The tread 19 is typically made of a different type of plastic than the hub. The hub is provided with circumferential grooves 37 as well as grooves 39 that extend parallel to the axis and are located on the perimeter of the hub. In addition, channels may be provided that are parallel to the grooves 39. This grooving arrangement serves to secure the tread to the hub. The hub is provided with a groove 41 that extends around the circumference of the hub and receives the ring 23.

The conductive ring 23 is located around the circumference of the hub in the groove 41. The conductive ring 23 has a projection 43 that extends inwardly. This projection 43 has an opening so as to receive the wire 25. The conductive ring 23 also has a number of projections 45 that extend radially outward. These projections can be of any shape, such as cylindrical. In the preferred embodiment, the projections 45 are shown as tapered so as to decrease in surface area as they extend radially outward from the hub. The conductive ring 23 is made of plastic with conductive material added thereto. For example, in the preferred embodiment, the conductive ring is made of thermoplastic urethane (TPU) with metal fibers. In the preferred embodiment, the metal fibers are stainless steel. However, other metals or conductors can be used, such as powdered graphite. In the preferred embodiment, the ring 23 is made of the same polymer as the tread.

The wire 25 is bent into shape so as to form a contour that follows the outside shape of the hub 17. The hub 17 is provided with a cross-section, when viewed from the axle to the tread, in the shape of an I-beam. There is an inner flange 47 that is located adjacent to the bearings 21 and an outer flange 49 that is located adjacent to the tread. The central portion 25B of the wire is bent into shape to match this configuration and is received by the channel 35B. In addition, the wire has end portions 25A, 25C that extend inward. There is a conductive ring end portion 25C that extends into the channel 35C and the conductive ring inner projection 43. There is also a bearing end portion 25A that extends into the channel 35A so as to contact one of the bearings 21. In the preferred embodiment, the wire 25 is made of stainless steel and is stamped. However, the wire can be made of various other types of conductors.

To make the wheel 11, the hub 17 is molded and then removed from the mold. The hub can be made by a variety of types of molding, such as injection molding. Once the hub 17 is molded, the conductive ring 23 is then molded in place on the hub. This is accomplished by putting the hub into a mold and the molding the conductive ring 23 in place. This assures a secure fit between the conductive ring and the hub. The ring 23 can be injection molded.

Figure 1:
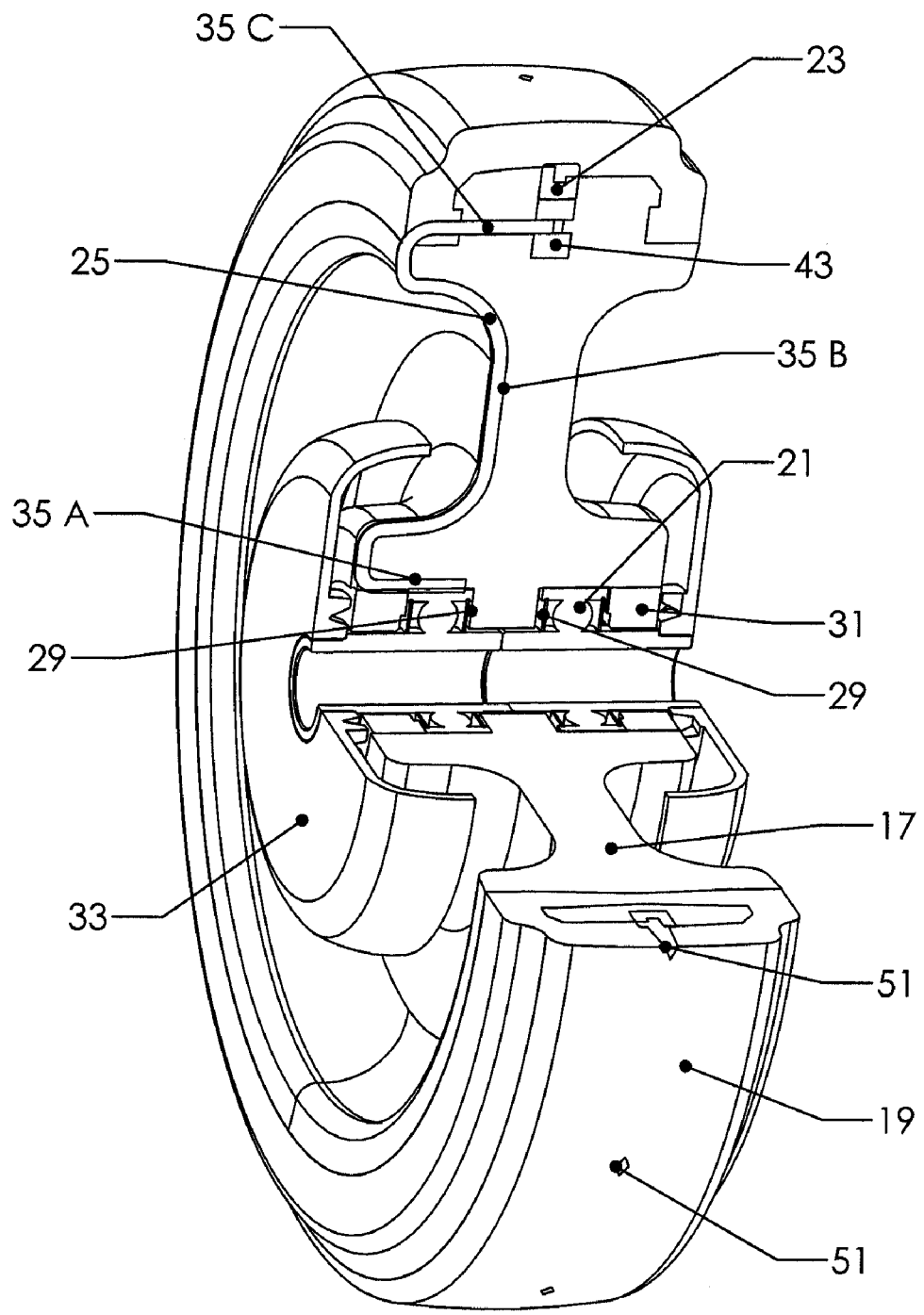
FIG. 1 is an isometric cut away view of a cart wheel of the present invention, in accordance with a preferred embodiment.

The wire 25 is then press fit into place in the channel portions 35A, 35B, 35C. At this time, the bearings 21 have not yet been inserted into the hub. The wire 25 is pressed into the inner projection 43 of the conductive ring 23. Then, the tread 19 is molded in place around the outer periphery of the hub 17. The wire 25 is held in place by the tread 19, which is molded over a portion of the wire. The tread 19 surrounds the ring projections 45 and secures the ring to the hub. The outermost ends 51 (see FIG. 1) of the projections 45 are exposed so as to contact the ground.

Once the molding has been finished, then the bearings 21 are press fit into place and the bushings 31 are then press fit in after the bearings. The bearing that is adjacent to the wire makes electrical contact therewith. The wire 25 is secured in place by the tread on one end and by the bearing on the other end. The wheel is now ready for installation into a yoke or other fixture.

The ring 23 and wire 25 are made of two different materials. The ring 23 is somewhat resilient, as is the tread 19. This is useful as the projections 45 are located in the tread and react to forces and loads in a similar manner. The ring 23, with its plural projections 45 (there are fourteen projections in the preferred embodiment), provide multiple points of contact around the circumference of the wheel with the ground. The wheel is a good conductor of static. In addition, the wheel is relatively inexpensive to produce.

The foregoing disclosure and showings made in the drawings are merely illustrative of the principles of this invention and are not to be interpreted in a limiting sense.

The invention claimed is:

1. A wheel for a cart, comprising:
    a) a hub having a central bore structured and arranged to receive a bearing and an axle, the hub made of a non-conductive material;
    b) a conductive ring located on an outer periphery of the hub, the conductive ring having projections that extend radially outward;
    c) a tread that encompasses the outer projections, the outer projections having ends that are exposed at an outer circumference of the tread, the tread made of a nonconductive material;
    d) a second conductor that extends from the central bore of the hub to the conductive ring, the second conductor having a central portion that is located on an exterior of the hub, an electrical conductive path is provided from the central bore of the hub to the tread outer circumference.

2. The wheel of claim 1 wherein the conductive ring is made of a first material and the second conductor is made of a second material.

3. The wheel of claim 1 wherein the conductive ring comprises plastic with conductive particles.

4. The wheel of claim 1 wherein the second conductor comprises a metal wire.

5. The wheel of claim 1, the second conductor further comprising end portions, with one end portion being exposed in the hub central bore and the other end portion extending into the hub to contact the conductive ring.

6. The wheel of claim 1 wherein the second conductor has a portion embedded in the tread.

7. The wheel of claim 1 wherein:
   a) the conductive ring is made of a first material and the second conductor is made of a second material;
   b) the conductive ring comprises plastic with conductive particles;
   c) the second conductor comprises a metal wire;
   d) the second conductor further comprising end portions, with one end portion being exposed in the hub central bore and the other end portion extending into the hub to contact the conductive ring;
   e) the second conductor has a portion embedded in the tread.

8. A method of making a wheel for a cart, comprising the steps of:
   a) providing a hub made of a nonconductive material, the hub comprising a central bore for receiving a bearing;
   b) installing a conductive ring on a circumference of the hub, the ring comprising conductive projections that extend out from the hub;
   c) positioning a second conductor on the hub and extending from the central bore to the conductive ring;
   d) forming a tread on the circumference of the hub, the tread retaining the conductive ring and the second conductor in place, the tread not overlaying outer ends of the conductive ring projections;
   e) inserting a bearing into the central bore so as to contact the bearing with the second conductor and form a conductive path from the bearing to the wheel outer circumference.

9. The wheel of claim 1 wherein the second conductor is structured and arranged to electrically contact the bearing when the hub central bore receives the bearing.

* * * * *